(12) United States Patent
Albers

(10) Patent No.: US 12,196,102 B2
(45) Date of Patent: Jan. 14, 2025

(54) ROTOR WITH A BALANCING FLANGE, ROTOR ASSEMBLY WITH AT LEAST ONE ROTOR, AND TURBOMACHINE WITH AT LEAST ONE ROTOR OR WITH A ROTOR ASSEMBLY

(71) Applicant: MTU Aero Engines AG, Munich (DE)

(72) Inventor: Lothar Albers, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/159,151

(22) Filed: Jan. 25, 2023

(65) Prior Publication Data

US 2023/0235672 A1    Jul. 27, 2023

(30) Foreign Application Priority Data

Jan. 26, 2022  (DE) ............... 10 2022 101 762.1

(51) Int. Cl.
*F01D 5/02*  (2006.01)

(52) U.S. Cl.
CPC .......... *F01D 5/027* (2013.01); *F05D 2260/96* (2013.01)

(58) Field of Classification Search
CPC .............................. F01D 5/027; F05D 2260/96
See application file for complete search history.

(56) References Cited

U.S. PATENT DOCUMENTS

| | | |
|---|---|---|
| 5,473,883 A | 12/1995 | Naudet |
| 5,537,814 A | 7/1996 | Nastuk et al. |
| 2012/0082542 A1 | 4/2012 | Misawa |
| 2012/0207603 A1* | 8/2012 | Woods ............... F01D 5/027 |
| | | 416/145 |
| 2013/0071245 A1* | 3/2013 | Denis ............... F04D 29/662 |
| | | 29/888.012 |
| 2015/0369045 A1* | 12/2015 | Aiello ............... F01D 5/141 |
| | | 29/889.21 |
| 2019/0383144 A1* | 12/2019 | Oren ............... F01D 5/027 |
| 2020/0072055 A1* | 3/2020 | Winder ............... F01D 5/066 |

FOREIGN PATENT DOCUMENTS

| | | |
|---|---|---|
| DE | 102016218285 A1 | 3/2018 |
| DE | 102020209471 A1 | 2/2022 |
| EP | 3091178 A1 | 11/2016 |
| EP | 3091177 B1 | 12/2017 |

(Continued)

*Primary Examiner* — Grant Moubry
*Assistant Examiner* — Ruben Picon-Feliciano
(74) *Attorney, Agent, or Firm* — Hinckley, Allen & Snyder, LLP; David R. Josephs

(57) ABSTRACT

The invention relates to a rotor for integration in a turbomachine, with a rotor base body, wherein, on the rotor base body in a rotor outer space of the rotor, at least one blade element or airfoil is mounted, wherein the rotor base body extends in an axial direction of the rotor and comprises a connecting section, which extends in an axial direction of the rotor for connection to at least one further rotor and separates the rotor outer space from a rotor inner space of the rotor, wherein the connecting section comprises, in the axial direction, at a front side, preferably in the axial direction at a downstream-lying front side, a balancing flange, wherein the balancing flange is configured for compensating an imbalance of the rotor and extends in the radial direction in the rotor outer space, at least in sections.

15 Claims, 3 Drawing Sheets

(56) References Cited

FOREIGN PATENT DOCUMENTS

Figure 1:
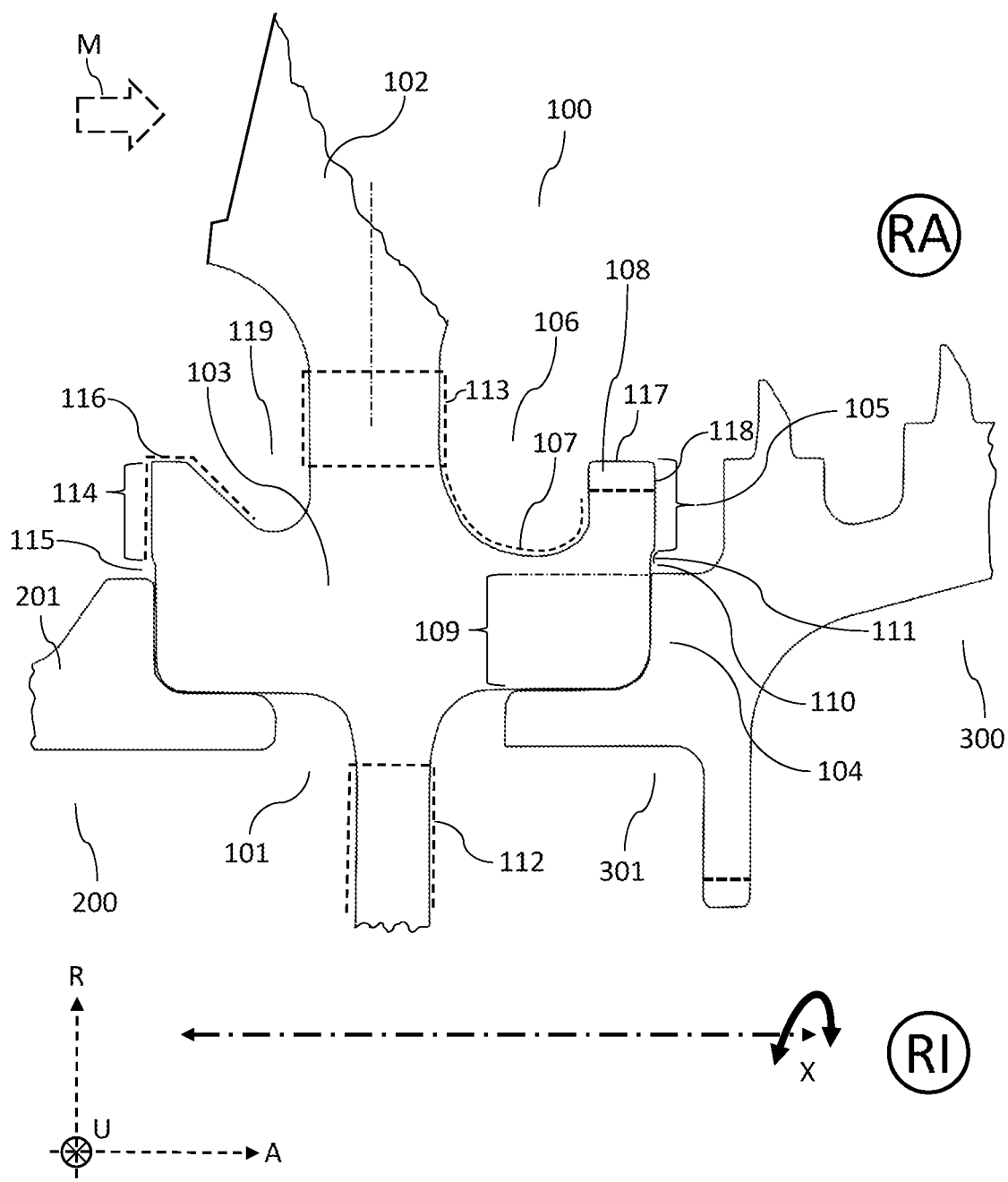

| | | | |
|---|---|---|---|
| EP | 3404207 | B1 | 6/2020 |
| EP | 3192966 | B1 | 5/2021 |
| EP | 3091179 | B1 | 6/2021 |
| EP | 3851632 | A1 | 7/2021 |
| GB | 2004624 | A | 4/1979 |
| GB | 2283535 | A | 5/1995 |

* cited by examiner

ROTOR WITH A BALANCING FLANGE, ROTOR ASSEMBLY WITH AT LEAST ONE ROTOR, AND TURBOMACHINE WITH AT LEAST ONE ROTOR OR WITH A ROTOR ASSEMBLY

BACKGROUND OF THE INVENTION

The present invention lies in the field of turbomachines and relates to a rotor with a balancing flange for balancing or compensating for one or more imbalances. The present invention further relates to a rotor assembly with a shaft and a plurality of rotors as well as to a turbomachine with a rotor assembly or with at least one rotor.

In the field of turbomachines, such as, for example, in a gas turbine or in a compressor, rotors are utilized as rotating wheels having a plurality of blade elements in order to set a medium into motion. As working medium, the medium can be, for example, a flow of air or a flow of exhaust gas or a mixture of a flow of air and a flow of exhaust gas. On account of transient mechanical and thermal operating conditions and thus dynamic loads, rotors have to fulfill very diverse requirements and nonetheless ensure appropriate functionality. Above all, this is the case for a mobile gas turbine in the form of an aircraft gas turbine, for example.

In order to reduce bearing loads and wear, for example, and preferably to increase smooth running and service life, there needs to be a compensation of any imbalance existing at the rotors. In the case of imbalances of a rotor, a distinction is made between static, dynamic, and aerodynamic imbalances. Static and dynamic imbalances arise, for example, owing to uneven mass distributions in individual blade elements or airfoils of a rotor as a consequence of fabrication-related tolerances.

Above all, particularly in the case of high rotational speeds of the rotor, depending on the particular field of application, a static and dynamic balancing of the rotor, that is, a balancing of the rotor for a running operating state or operating range, is essential or required in order to neutralize the imbalance torque and to be able to operate the rotor subsequently in a low-wear and low-maintenance manner.

Furthermore, preferably in the case of rotors for aircraft gas turbines with corresponding compressors and the rotor assemblies associated therewith, it is necessary to ensure that, above all, a drainage of medium for lubrication, such as, for example, oil, can take place out of the interior of the rotor and, overall, out of the interior of the rotor assembly in order that, for example, a contamination of an aircraft cabin is prevented. However, this necessitates a corresponding geometric design of the inner space of the rotor in such a way that, for example, no cavities, undercuts, or other regions in which the medium for lubrication can collect are allowed to be present.

In known rotors, balancing devices or balancing elements are present and, due to a predetermined geometric design, are necessarily situated at particular corresponding points.

Known from European Patent Specification No. EP 3 192 966 B1 is a rotor assembly for an axial turbomachine with an axially aligned balancing flange as well as a correspondingly equipped compressor of a turbomachine. A first rotor base body has a connecting flange extending in the axial direction, which serves for form-fitting and force-fitting connection to a second adjacent rotor base body by way of its rotor arm with a connecting flange. The balancing of the first rotor base body occurs by means of the balancing flange that is formed radially inside by the connecting flange of the first rotor base body and extends in the axial direction. The balancing flange provides an end portion in the axial direction for the removal of material.

Described in the European Patent Specification No. EP 3 404 207 B1 is a rotor assembly with a rotor and a balancing element for an engine as well as a method for mounting the balancing element. The rotor comprises a rotor disk that extends in the peripheral direction and has an attachment section, which is arranged outside of the inner space of the rotor. Arranged on the attachment section of the rotor disk is a multipart hook-shaped balancing element, which has a radial outer leg section and a radial inner leg section and can be fastened to the attachment section by means of a fixing element in the form of a screw bolt. The screw bolt is mounted adjustably in order to alter a radial spacing distance of the two leg sections of the balancing element.

The European Patent Specification No. EP 3 091 177 B1 relates to a rotor for a turbomachine as well as a compressor. The rotor has a first rotor base body and a second rotor base body. The second rotor base body is designed for form-fitting flanged attachment to the first rotor base body by way of a rotor arm. Arranged on the end portion on the radial outer side of the rotor arm is a balancing ring, which is integrally joined to the rotor arm.

Described in the European Patent Application No. EP 3 091 178 A1 is a rotor drum for a turbomachine, which has two adjacent rotor base bodies. The second rotor base body is equipped with a rotor arm that has a passage opening for fluids to flow out of the inner space of the rotor. Furthermore, a balancing ring is arranged at the end portion on the radial outer side of the rotor arm and is integrally joined to the rotor arm.

The European Patent Specification No. EP 3 091 179 B1 relates to a rotor assembly for a turbomachine as well as a compressor. The rotor assembly has a first rotor with a first rotor stage, that is, a first rotor base body, and has a shaft with a first hub for connecting the first rotor stage to the shaft. The hub is equipped with a balancing device having a balancing weight for balancing the first rotor stage, it being possible to arrange a plurality of balancing weights over the periphery of the hub. The balancing weight is bolted onto a balancing flange. The first rotor stage itself does not have a balancing device. Arranged on the downstream-facing side of the second rotor stage is a balancing band on the outwardly directed side of the rotor arm of the second rotor base body.

Reference is made to U.S. Pat. Nos. 5,537,814 and 5,473,883 for further prior art.

The known rotors and rotor assemblies are relatively complicated in terms of their concepts for the compensation or the balancing of one or more imbalances and/or consist of a plurality of components and thus are relative costly, for example. In addition, owing to corresponding balancing devices or balancing elements, known rotors suffer structural-mechanical detriments or drawbacks, which need to be reduced or preferably prevented.

SUMMARY OF THE INVENTION

An object of the present invention is to provide an improved rotor that, above all, is configured so that it is possible to balance or compensate for an imbalance in a relatively simple way and that, in addition, is characterized by improved structural-mechanical properties. Furthermore, an object of the present invention is to provide a rotor assembly with a plurality of rotors in accordance with the present invention as well as a turbomachine having such a rotor assembly or having at least one rotor.

The object is achieved by the features of the present invention. Further exemplary embodiments and applications of the present invention are explained in detail in the following description with reference in part to the figures.

In accordance with a first general aspect, the present invention relates to a rotor for integration in a turbomachine, preferably in an axial and/or mobile turbomachine, with a rotor base body, wherein at least one blade element or airfoil is mounted on the rotor base body in an outer space of the rotor, wherein the rotor base body extends essentially in a radial direction of the rotor and comprises a connecting section, which extends in an axial direction of the rotor for connection to at least one further rotor and separates the outer space of the rotor from an inner space of the rotor, wherein the connecting section comprises a balancing flange in the axial direction at a front side, preferably in the axial direction at a downstream-lying front side, wherein the balancing flange is designed and/or is configured for the compensation of an imbalance of the rotor and, at least in sections, extends essentially in the radial direction in the outer space of the rotor.

The rotor in accordance with the present invention is preferably designed for integration in an aircraft gas turbine and/or in a compressor. By way of the rotor, which may be referred to as a rotating wheel or as a blade wheel, it is possible to ensure a simple compensation of one or more imbalances by way of the balancing flange once the balancing flange is aligned and/or extends radially outward in regard to its position. The connecting section can be designed as a rotor arm of the rotor in the form of a projection on a first front side and on a second front side in the axial direction.

The connecting section can extend preferably both in an upstream axial direction and in a downstream axial direction away from the rotor base body and can be set up to connect the rotor to two other rotors. The connecting section can thereby project from the rotor radius both in the upstream direction and in the downstream direction preferably by no more than 30%, in particular by no more than 20%, in each case. Further preferably, the connecting section can be free of sealing fins on its radial outer surfaces. Further preferably, the connecting section can be designed to be engaged from beneath by rotor arms of the two other rotors. To this end, the connecting section has an underedge that extends in a straight line essentially parallel to the axial direction both upstream and downstream (that is, a radial inner side extending in the axial direction).

The axial direction can preferably denote a longitudinal direction of the rotor and, in particular, a longitudinal direction along a shaft of an assembly of a plurality of successive rotors. The radial direction can lie, starting from an axis of rotation of the rotor, preferably perpendicular to this axis of rotation.

In accordance with a further aspect of the present invention, it can be provided that a cavity or hollow space is formed between the balancing flange and the rotor base body, wherein, at least in sections, the cavity or the hollow space has an essentially arch-shaped contour in one view, preferably in a sectional view, and/or wherein the cavity or the hollow space is essentially channel-shaped or essentially groove-shaped in design in a peripheral direction of the rotor and/or wherein the cavity or the hollow space is designed to be free of undercuts in the radial direction.

In this way, for example, it can be ensured that, by use of a corresponding machining tool, it is possible to process correspondingly the region of the connecting section between the balancing flange and the further sections of the rotor base body by means of a lathing tool or a routing tool or by means of a shot peening tool, for example. Furthermore, by designing the cavity or hollow space as disclosed herein, it is possible to improve the structural-mechanical properties, at least at certain points of the rotor.

It is possible for the balancing flange to comprise a processing section that extends in a peripheral direction of the rotor and is designed for material removal, preferably for material removal by machining, with the processing section preferably being essentially ring-shaped in design and/or being pressed, shrink-fitted, or welded onto the balancing flange or else being produced integrally in one piece with the balancing flange. Accordingly, it is possible preferably to improve the rotor-dynamic properties of the rotor by eliminating corresponding imbalances by way of the balancing flange. For example, the smooth running of the rotor is increased and bearing loads are reduced.

In accordance with a further aspect of the present invention, it can be provided that the connecting section has a contact flange, which is designed for contacting a further rotor in order to connect the rotor to the further rotor in an essentially form-fitting manner and/or essentially force-fitting manner, wherein the balancing flange is arranged and/or designed to be spaced apart from the contact flange, preferably to be spaced apart in the radial direction, and/or wherein the balancing flange is arranged and/or designed to be offset from the contact flange, preferably offset from the front side of the contact flange, in the axial direction at least in sections. In other words, the balancing flange can extend in the axial direction beyond the contact flange. The contact flange can be designed appropriately and have oriented front sides as contacting tight-fit faces.

It is possible that, at the front side, the balancing flange and the contact flange are joined to each other or transition into each other by way of a shoulder, with the shoulder having an essentially arch-shaped contour in one view, preferably in a sectional view, at least in sections.

In this way, for example, a further simplified production and/or processing of the rotor is ensured.

In accordance with a further aspect of the present invention, it can be provided that, in the radial direction, the contact flange is arranged lying opposite to the balancing flange, at least in sections.

It is possible for the rotor base body to have a first essentially disk-shaped support section and a second essentially disk-shaped support section, with the connecting section being arranged in the radial direction between the first support section and the second support section and/or being produced integrally in one piece with the first support section and the second support section.

In accordance with a further aspect of the present invention, it can be provided that the balancing flange has an essentially cylinder-shaped front face in the axial direction and an essentially flat front face in the radial direction, with the essentially cylinder-shaped front face being arranged and/or being aligned perpendicularly to the essentially flat front face. In other words, in one view, preferably in a sectional view, the balancing flange has an essentially square contour or an essentially rectangular contour, omitting the link to the connecting section.

In accordance with a further aspect of the present invention, it can be provided that the connecting section comprises a marking flange, which is arranged in the axial direction on the front side of the rotor that lies opposite to the balancing flange, with, in one view, preferably a sectional view, the marking flange having an essentially trapezoidal contour, at least in sections.

It is possible for the balancing flange and at least the connecting section to be produced integrally in one piece and/or in a materially bonded manner at least in sections, preferably by at least one casting operation and/or by at least one injection-molding operation and/or by at least one welding operation and/or by at least one lathing or routing operation.

In accordance with a second general aspect, the present invention relates to a rotor assembly with a shaft and at least one rotor as disclosed herein, wherein the at least one rotor is mounted on the shaft in a detachable manner and wherein, in the axial direction, at least two further rotors are connected to the at least one rotor through the connecting section in an essentially form-fitting manner and/or essentially force-fitting manner.

In accordance with a third general aspect, the present invention relates to a turbomachine with at least one rotor as disclosed herein or with a rotor assembly as disclosed herein, wherein the turbomachine is designed as an aircraft gas turbine or as a compressor.

A compressor according to the invention can be, for example, a high-pressure compressor of an aircraft gas turbine.

BRIEF DESCRIPTION OF THE DRAWING FIGURES

The exemplary embodiments and features of the present invention described above can be combined with one another in any way. Further or other details and advantageous effects of the present invention will be explained below with reference to the attached figures.

Figure 2:
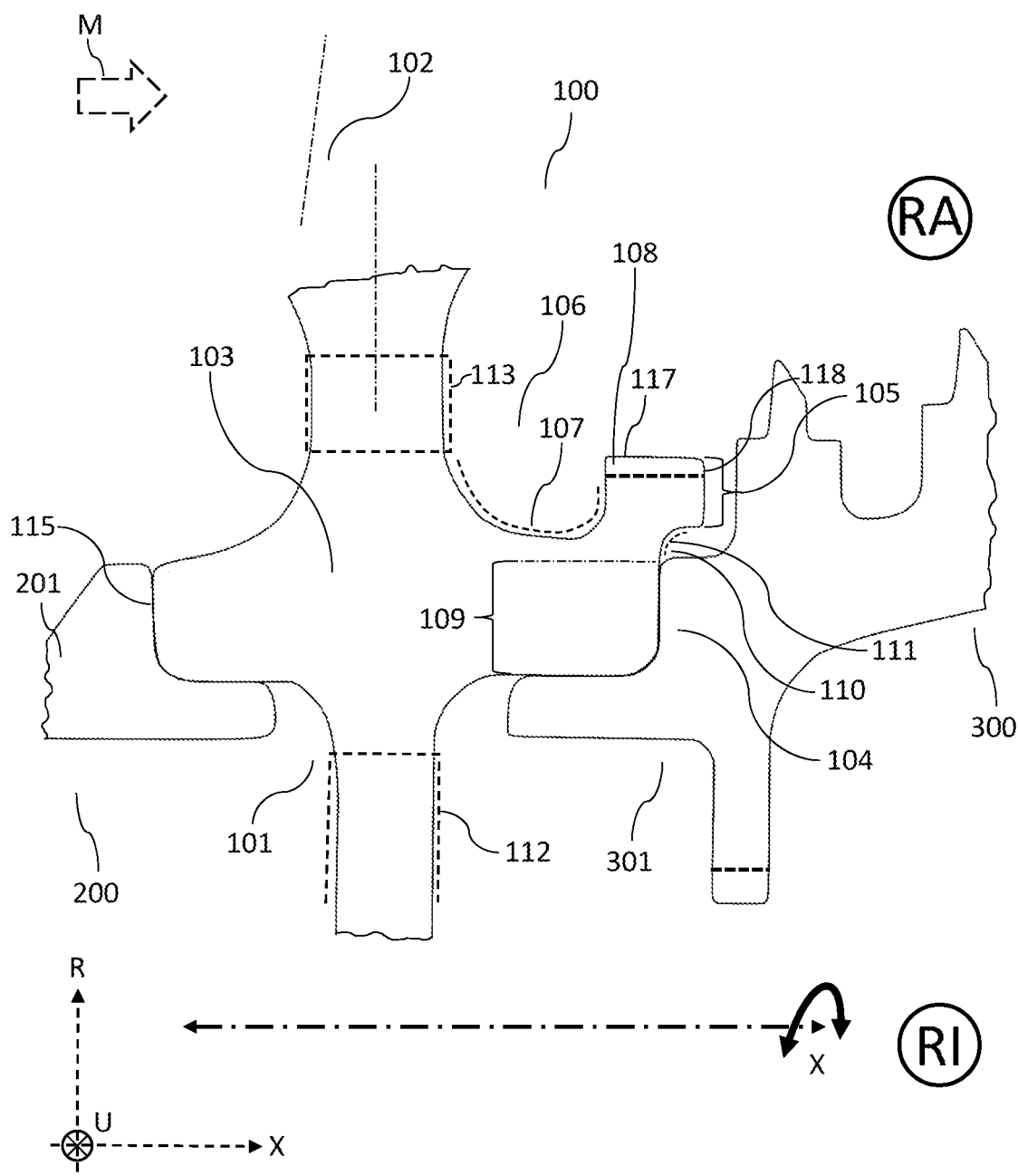
Figure 3:
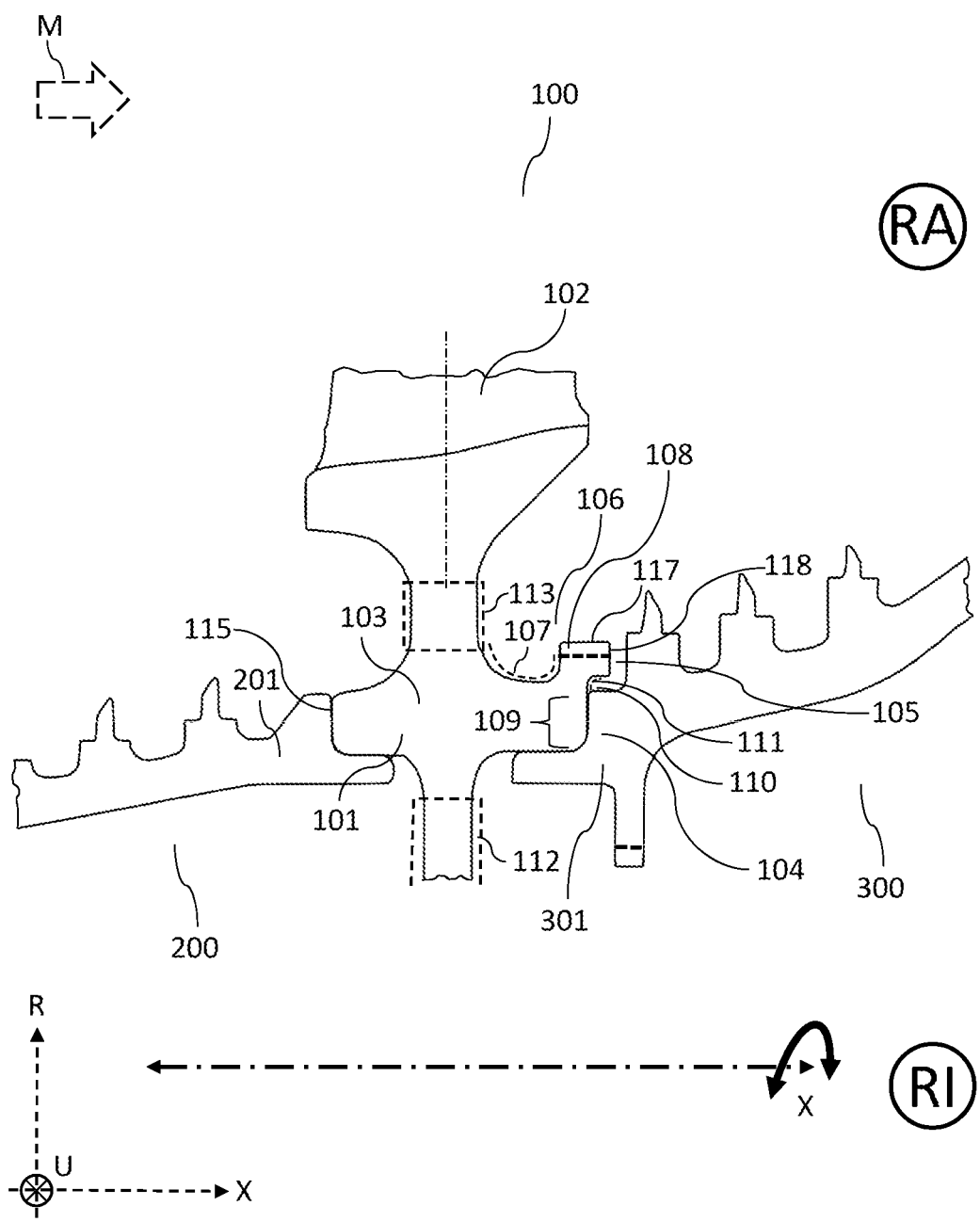

Shown are:

FIG. 1 an excerpt of a first exemplary embodiment of the rotor according to the present invention in a sectional view;

FIG. 2 an excerpt of a second exemplary embodiment of the rotor according to the present invention in a sectional view;

FIG. 3 a further excerpt of the second exemplary embodiment of the rotor from FIG. 2 in a sectional view.

DESCRIPTION OF THE INVENTION

Identical or functionally equivalent components or elements are marked in the figures with the same reference signs. In the explanation of the figures, reference is made in part also to the description of other exemplary embodiments and/or figures in order to avoid repetitions.

The following detailed description of the exemplary embodiments illustrated in the figures serves for detailed depiction or highlighting and is not intended to limit the scope of the present invention in any way.

FIG. 1 shows an excerpt of a first exemplary embodiment of the rotor 100 according to the present invention in a sectional view.

The rotor 100 is configured and arranged for a turbomachine, preferably a mobile and/or axial turbomachine. For reasons of clarity, the turbomachine is not illustrated in the figures. The turbomachine can be a gas turbine, preferably a mobile gas turbine, such as, for example, an aircraft gas turbine, or a compressor, such as, for example, a high-pressure compressor or a low-pressure compressor. The compressor can be, for example, a component of the mobile gas turbine in the form of an aircraft gas turbine. Accordingly, a working medium M flows through the rotor 100 essentially in the axial direction A, this being indicated in FIG. 1 by the dashed arrow. Preferably, the working medium M can be air.

The rotor 100 is configured and arranged for attachment, preferably detachable attachment, to a shaft in order to be able to execute a rotational movement around the axis of rotation X, with the axis of rotation X being parallel to the axial direction A of the rotor 100. For reasons of clarity, the shaft is likewise not illustrated in the figures.

Preferably, the rotor 100 can be a component of a rotor assembly, preferably of a multistage rotor assembly. Accordingly, the rotor assembly comprises a plurality of rotors 100, 200, and 300, which contribute to the compression of the working medium M. Illustrated partially in FIG. 1 are two rotors 200 and 300, which are arranged adjacently to the rotor 100 in the axial direction A. The connecting section 201 of the rotor 200 is illustrated partially as a rotor arm and the connecting section 301 of the rotor 300 is illustrated partially as a rotor arm. The connection of the rotors 100, 200, and 300 to one another occurs essentially in a form-fitting manner and preferably additionally in an essentially force-fitting manner.

The rotor 100 or the individual components and elements of the rotor 100 can preferably be produced from a metallic material or from a combination of metallic materials. The rotor 100 or the individual components and elements of the rotor 100 can be produced by at least one casting operation and/or by at least one injection-molding operation, preferably by at least one metal powder injection-molding operation. It is also possible for the rotor 100 or individual components and elements of the rotor 100 to be produced by at least one sintering operation and/or by at least one 3D printing operation. Preferably, the rotor 100 can be of integral one-piece design. It is additionally or alternatively possible for the rotor 100 to be produced and/or processed by machining of a solid block material and/or by at least one welding operation.

The rotor 100 comprises a rotor base body 101, which is designed as a support structure or base structure of the rotor 100 for the mounting of at least one blade element 102, preferably a plurality of blade elements 102. The blade element 102 can be designed, for example, as a blade element that is known from prior art. The at least one blade element 102 is mounted in the rotor base body 101 in the so-called rotor outer space RA. The mounting of the at least one blade element 109 can occur in the form of an attachment by way of known concepts or mechanisms.

The rotor base body 101 extends essentially in an radial direction R of the rotor 100 and comprises a connecting section 103. The connecting section 103 is designed as a so-called rotor arm for connection to at least one further rotor 200, 300 in the axial direction A. In other words, the connecting section 103 extends in the axial direction A of the rotor 100 and accordingly separates the rotor outer space RA from a rotor inner space RI of the rotor 100. In the axial direction A at a front side 104, preferably in the axial direction A at a downstream-lying front side 104, the connecting section 103 comprises a balancing flange 105, which may also be referred to as a balancing band. In other words, the balancing flange 105 is arranged in the axial direction A at a free end of the connecting section 103.

In accordance with the invention, the balancing flange 105 is designed and/or configured for the compensation or the balancing of an imbalance or of imbalances of the rotor 100 and, at least in sections, extends in the radial direction R in the rotor outer space RA. Accordingly, the balancing flange 105 extends away in the radial direction R, starting from the connecting section 103, that is, outwards and thus radially outwards.

The rotor base body 101 has a first essentially disk-shaped support section 112 and a second essentially disk-shaped support section 113. The connecting section 103 is arranged in the radial direction R between the first support section 112 and the second support section 113. Formed between the balancing flange 105 and the rotor base body 101, preferably the second support section 113, is a cavity 106 or a hollow space. As can also be seen from the sectional view in FIG. 1, the cavity 106 has, at least in sections, an arch-shaped contour 107. In other words, the cavity 106 has a channel-shaped design in a peripheral direction U. Furthermore, the cavity 106 is designed to be free of undercuts in the radial direction R. In this way, it is possible, for example, to ensure a corresponding machining by a production tool, such as, for example, by a lathing tool, a routing tool, or a ball peening tool. Owing to the design of the cavity 106 as disclosed herein, the rotor 100 is characterized by improved structural-mechanical properties. For example, local detrimental stress peaks in the region of the balancing flange 105 at the transition of the connecting section 103 to the second support section 113 are prevented or at least significantly reduced. Furthermore, it is possible to create inherent stresses at defined points in order to increase durability, for example.

The balancing flange 105 comprises a processing section 108, which extends in the peripheral direction U of the rotor 100 and is designed for material removal, preferably for machined removal of material. The processing section 108 is preferably essentially ring-shaped in design and can be pressed and/or welded onto the balancing flange 105 by, for example, a friction welding operation, or else can be produced together with the balancing flange integrally in one piece and accordingly also in a material-bonded manner.

In the axial direction A, the radially outwardly directed balancing flange 105 comprises an essentially cylinder-shaped front face 117 and, in the radial direction R, an essentially flat front face 118. The essentially cylinder-shaped front face 117 is arranged and/or aligned essentially perpendicularly to the essentially flat front face 118.

The connecting section 103 has a contact flange 109. The contact flange 109 is designed for contacting the rotor 300 in order to connect the rotor 100 to the further rotor 300 in an essentially form-fitting manner and/or essentially force-fitting manner. The connection hereby occurs through corresponding front faces of the contact flange 109 in the radial direction R and in the axial direction A as contact surfaces, which are not indicated in greater detail in the figures for reasons of clarity. The balancing flange 105 is arranged and/or designed in the radial direction R to be spaced apart from the contact flange 109. Furthermore, the balancing flange 105 is arranged and/or designed to be offset with respect to the contact flange 109, that is, with respect to a front face of the contact flange 109 in the axial direction A at least in sections. The balancing flange 105 is joined to the contact flange 109 at the front side 104 of the rotor 100, that is, of the connecting section 103, by way of a shoulder 110. As can be seen from the sectional view in FIG. 1, the shoulder 110 has an essentially arch-shaped contour 111 at least in sections. It can be further seen that the contact flange 109 is arranged in the radial direction R—lying opposite to the balancing flange 105, at least in sections. Accordingly, coming from the rotor inner space RI, the rotor 300 is joined by way of the connecting section 301 to the contact flange 109.

The connecting section 103 of the rotor 100 can further comprise, as the exemplary embodiment in FIG. 1 shows, a marking flange 114. The marking flange 114 is arranged in the axial direction A on the front side 115 lying opposite to the balancing flange 105. It can be seen from the sectional view in FIG. 1 that the marking flange 114 has, at least in sections, an essentially trapezoidal contour 116. The marking flange 114 transitions into the second support section 113 of the rotor base body 101 in part by way of the cavity 119.

FIG. 2 shows an excerpt of a second exemplary embodiment of the rotor 100 according to the present invention in a sectional view. The rotor 100 in FIG. 2 is essentially identical to the first exemplary embodiment of the rotor 100 or at least is similar in design and/or configuration. However, the rotor 100 in FIG. 2 has no marking flange 114.

Furthermore, the shoulder 110 between the balancing flange 105 and the contact flange 109 is more pronounced in design for the rotor 110, that is, larger in design, than the shoulder 110 of the rotor 100 in accordance with the first exemplary embodiment in FIG. 1.

FIG. 3 shows a further excerpt of the second exemplary embodiment of the rotor from FIG. 2 in a sectional view, from which it is clearly seen that the corresponding connecting sections 201 and 301 of the further rotors 200 and 300 engage with their respective front faces as tight-fit faces under the connecting section 103 in the region of the rotor inner space RI. In other words, the rotor 100, together with the connecting section 103 as rotor arm and the correspondingly positioned and aligned balancing section 105, is designed and/or configured in such a way that the connecting section 103 of the rotor 100 lies outward in the radial direction R in the region of connection to the rotors 200 and 300 and, accordingly, separates the rotor inner space RI from the rotor outer space RA.

The present invention makes it possible, in particular, to provide a rotor 100 that has improved structural-mechanical properties and makes possible a simple compensation of an imbalance or of imbalances by way of the position of the balancing flange 105, that is, the balancing band. Accordingly, it is further possible, above all, to achieve a low-wear operation and a longer lifetime of the rotor.

The present invention is not limited to the exemplary embodiments described above. Instead, a large number of variants and modifications are possible, which likewise make use of the inventive concepts and therefore fall within the protective scope of the invention. Preferably, the present invention also claims protection for the subject and the features of the dependent claims regardless of the claims referred to.

What is claimed is:

1. A rotor for integration in a turbomachine, the rotor comprising:
    a rotor base body, wherein, on the rotor base body in a rotor outer space of the rotor, at least one blade element or airfoil is mounted,
    wherein the rotor base body extends in a radial direction of the rotor and comprises a connecting section, which extends in an axial direction of the rotor for connection to at least one further rotor and separates the rotor outer space from a rotor inner space of the rotor, the axial direction being in a longitudinal direction of the turbomachine,
    wherein the connecting section comprises, in the axial direction of a front side, a balancing flange which extends radially outward from the connecting section and, at least in sections, extends in the radial direction in the rotor outer space, wherein the balancing flange is configured for compensating an imbalance of the rotor.

2. The rotor according to claim 1,
wherein a cavity is formed between the balancing flange and the rotor base body, wherein, in a sectional view, the cavity has, at least in sections, an arch-shaped contour or a circular contour, and/or
wherein the cavity is configured and arranged in a peripheral direction of the rotor in a channel-shaped or groove-shaped manner, and/or
wherein the cavity is free of undercuts in the radial direction.

3. The rotor according to claim 1,
wherein the balancing flange comprises a processing section, which extends in a peripheral direction of the rotor and is configured and arranged for removal of machined material,
wherein, the processing section is ring-shaped and/or is pressed or welded onto the balancing flange, or is integrally produced together with the balancing flange in one piece.

4. The rotor according to claim 1,
wherein the connecting section has a contact flange, which is configured and arranged for contacting a further rotor, to connect the rotor to the further rotor in a form-fitting manner and/or force-fitting manner,
wherein the balancing flange is arranged and/or configured and arranged to be spaced apart from the contact flange, is arranged and/or configured to be spaced apart in the radial direction, and/or
wherein the balancing flange is arranged and/or configured to be offset with respect to a front face of the contact flange, in the axial direction, at least in sections.

5. The rotor according to claim 4, wherein, at the front side, the balancing flange and the contact flange are connected to each other or transition into each other by way of a shoulder, wherein, in a sectional view, the shoulder has an arch-shaped contour, at least in sections.

6. The rotor according to claim 4, wherein, in the radial direction, the contact flange is arranged lying opposite to the balancing flange, at least in sections.

7. The rotor according to claim 1,
wherein the rotor base body has a first disk-shaped support section and a second disk-shaped support section,
wherein the connecting section is arranged in the radial direction between the first support section and the second support section.

8. The rotor according to claim 1,
wherein, in the axial direction, the balancing flange has a cylinder-shaped front face and, in the radial direction, has a flat front face,
wherein the cylinder-shaped front face is arranged and/or aligned perpendicularly to the flat front face.

9. The rotor according to claim 1,
wherein the connecting section comprises a marking flange, which, in the axial direction, is arranged on the front side of the rotor lying opposite to the balancing flange,
wherein, in a sectional view, the marking flange has a trapezoidal contour, at least in sections.

10. The rotor according to claim 1, wherein the balancing flange and at least the connecting section are produced, at least in sections, integrally in one piece, by at least one casting operation and/or by at least one injection-molding operation and/or by at least one welding operation.

11. A rotor assembly with a shaft and the at least one rotor according to claim 1, wherein the at least one rotor is attached to the shaft in a detachable manner and wherein, in the axial direction, at least two further rotors are connected to the at least one rotor by way of the connecting section in a form-fitting manner and/or a force-fitting manner.

12. The rotor assembly according to claim 11, wherein the form-fitting or force-fitting of the rotor with the adjacent rotors and are configured and arranged so, in the radial direction, the adjacent rotors and both engage the connecting section of the rotor in the region of the respective form-fitting or force-fitting.

13. The turbomachine having the at least one rotor according to claim 1, wherein the turbomachine is configured and arranged as an aircraft gas turbine or as a compressor.

14. The turbomachine having the rotor assembly according to claim 11, wherein the turbomachine is configured and arranged as an aircraft gas turbine or as a compressor.

15. The rotor according to claim 5, wherein, in the radial direction, the contact flange is arranged lying opposite to the balancing flange, at least in sections.

* * * * *